(12) United States Patent
Schrotter

(10) Patent No.: US 8,418,540 B2
(45) Date of Patent: Apr. 16, 2013

(54) FORCE-TRANSMISSION DEVICE FOR CONNECTING ENGINE TO DRIVE/LOAD SYSTEM OF TEST STAND

(75) Inventor: Wolfgang Schrotter, Graz (AT)

(73) Assignee: AVL List GmbH, Graz (AT)

( * ) Notice: Subject to any disclaimer, the term of this patent is extended or adjusted under 35 U.S.C. 154(b) by 362 days.

(21) Appl. No.: 12/805,150

(22) Filed: Jul. 14, 2010

(65) Prior Publication Data

US 2011/0011168 A1   Jan. 20, 2011

(30) Foreign Application Priority Data

Jul. 20, 2009   (AT) ................................ GM451/2009

(51) Int. Cl.
*G01M 15/02*   (2006.01)
(52) U.S. Cl.
USPC ........................................................ 73/116.02
(58) Field of Classification Search ............... 73/116.01, 73/116.02, 116.04, 116.05, 118.01, 118.02
See application file for complete search history.

(56) References Cited

U.S. PATENT DOCUMENTS

| | | | |
|---|---|---|---|
| 3,501,183 A | | 3/1970 | Stratienko |
| 4,195,494 A | * | 4/1980 | Kinney .......................... 464/158 |
| 4,387,589 A | * | 6/1983 | Larson ........................ 73/116.04 |
| 4,592,228 A | * | 6/1986 | Lucia .......................... 73/115.02 |
| 4,598,581 A | * | 7/1986 | Brekke ........................ 73/114.68 |
| 4,834,033 A | * | 5/1989 | Larsen .......................... 123/56.8 |
| 6,918,287 B2 | * | 7/2005 | Laws .......................... 73/116.05 |
| 7,980,123 B2 | * | 7/2011 | Ussery ........................ 73/116.01 |
| 2010/0200325 A1 | * | 8/2010 | Marsh et al. .................. 180/383 |
| 2011/0011169 A1 | * | 1/2011 | Schrotter ................... 73/116.02 |
| 2011/0041595 A1 | * | 2/2011 | Dank et al. ................. 73/116.06 |
| 2011/0252877 A1 | * | 10/2011 | Barnes ........................ 73/116.05 |

FOREIGN PATENT DOCUMENTS

| | | |
|---|---|---|
| DE | 10225886 | 12/2003 |
| JP | 2000161437 | 6/2000 |

OTHER PUBLICATIONS

English Abstract of DE10225886.

* cited by examiner

*Primary Examiner* — Eric S McCall
(74) *Attorney, Agent, or Firm* — Dykema Gossett PLLC

(57) ABSTRACT

A test stand for an internal combustion engine (1) is equipped with a drive (2) and/or load system (3), a force transmission device (4) with a system (5) for a non-destructive and play-free automatic coupling of the internal combustion engine (1) to the drive (2) and/or load system (3), and a sensor and evaluation system for automatically collecting and evaluating measurement variables. The system (5) for a non-destructive and play-free automatic coupling of the internal combustion engine includes an internally toothed and longitudinally slotted clamping sleeve (12) for receiving an element (13) of the internal combustion engine (1) in a form and force fitting manner, wherein the outer side of the clamping sleeve (12) is conically formed and interacts with a clamping collet (10) which is conically formed on the inside.

3 Claims, 1 Drawing Sheet

FORCE-TRANSMISSION DEVICE FOR CONNECTING ENGINE TO DRIVE/LOAD SYSTEM OF TEST STAND

BACKGROUND OF THE INVENTION

1. Field of the Invention

The invention relates to a test stand for an internal combustion engine which includes a drive and/or load system, a force transmission device with a system for a non-destructive and play-free automatic coupling of the internal combustion engine to the drive and/or load system, and a sensor and evaluation system for automatically collecting and evaluating measurement variables.

2. The Prior Art

For quality assurance of internal combustion engines in series production, a functional test (cold test) and a performance test (hot test) are often required in the production environment, wherein important functional tests and a complete performance test are carried out on the completely assembled internal combustion engine. In particular for the hot test, an optimal coupling of the internal combustion engine to the test stand is necessary.

DE 102 25 886 C1 discloses an engine test stand with a coupling device for separably connecting a drive device with an engine to be tested, which preferably axially movable coupling device comprises a multi-part coupling element which can be connected with an engine element in a form fitting and play-free manner. The individual parts of said coupling element are rotatably adjustable with respect to each other for fixing or releasing the engine element, for example a crankshaft flange pin.

Shaft couplings which are manually screwed together can also be configured in a play-free manner without major efforts; however, couplings which can be connected play-free without user intervention are in reality complex, expensive and can be tricky.

Thus, the object of the present invention was a test stand with an improved play-free coupling between the test object and the drive and/or load system of the test stand.

To solve this object, the test stand is characterized according to the invention in that the system for a non-destructive and play-free automatic coupling of the internal combustion engine includes an internally toothed and longitudinally slotted clamping sleeve for receiving an element of the internal combustion engine in a form and force fitting manner, wherein the outer side of the clamping sleeve is conically formed and interacts with a clamping collet which is conically formed on the inside.

According to an advantageous embodiment of the invention the clamping collet is pushed over the clamping sleeve by means of a disk spring.

Preferably, the system is configured for receiving a power takeoff shaft of the internal combustion engine in a form and force fitting manner.

In the following description, the invention is to be described in more detail by means of a preferred exemplary embodiment and with reference to the attached drawings.

DETAILED DESCRIPTION OF THE PREFERRED EMBODIMENT

Figure 1:
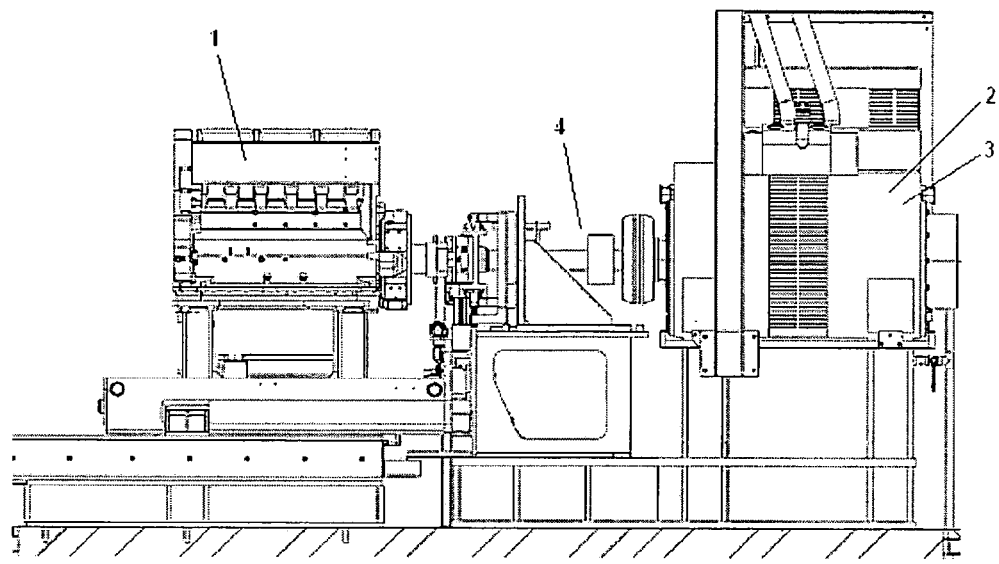
FIG. 1 shows an engine test stand in an overview.

An internal combustion engine 1 is connected to a drive 2 and/or load system 3. The internal combustion engine can be a gasoline engine or a diesel engine. Here, for driving the engine, in case of a cold test, and for inducing a load, in case of a hot test, separate electric machines can be used; however, a multi-function machine can also be used. The internal combustion engine 1 is coupled with the drive and/or load system 2, 3 via a force transmitting device 4, wherein said force transmitting device 4 does not only include a system 5 for a non-destructive and play-free, automatic coupling of the internal combustion engine 1 to the force transmission device 4, as shown in detail in FIG. 2, but also a system 6 coupled to the internal combustion engine 1 in a torsionally stiff manner for collecting different measurement variables, for example torque, rotation angle, etc. Moreover, advantageously, at least one vibration damper 7 and, if necessary, at least one multi-disk clutch 8 in connection with a torsion rod 9 can also be provided.

Figure 2:
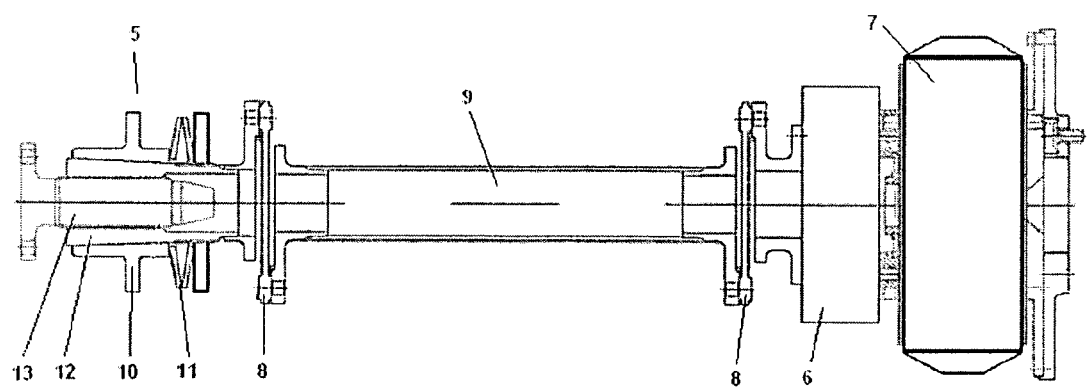
FIG. 2 shows a force transmission device of the test stand on a larger scale.

In the exemplary embodiment of the invention illustrated in FIG. 2, the system 5 comprises a clamping collet 10 which is formed conically on the inside and which can be pushed by means of the spring force of a disk spring 11 over an internally toothed and longitudinally slotted clamping sleeve 12 which is conically formed on the outside. Thereby, a power takeoff shaft 13 of the internal combustion engine 1, which shaft is inserted in the clamping sleeve 12, can be enclosed in a form and force fitting manner without user intervention.

By means of the play-free coupling, an improved signal quality of the received measurement variables can be ensured so that the signals can be processed in an easier and better manner into more conclusive measurement values.

The invention claimed is:

1. A test stand for an internal combustion engine, comprising:
   a drive and/or load system, and
   a force transmission device with a system for a non-destructive and play-free automatic coupling of the internal combustion engine to the drive and/or load system,
   wherein the system for a non-destructive and play-free automatic coupling of the internal combustion engine comprises an internally toothed and longitudinally slotted clamping sleeve for receiving an element of the internal combustion engine in a form and force fitting manner, and wherein an outer side of the clamping sleeve is conically formed and interacts with a clamping collet which is conically formed on an inside.

2. The test stand according to claim 1, including a disk spring for pushing the clamping collet over the clamping sleeve.

3. The test stand according to claim 1, wherein said element comprises a power takeoff shaft and wherein the system is configured for receiving said power takeoff shaft in a form and force-fitting manner.

* * * * *